United States Patent
(12) United States Patent
Evangelisti et al.

(10) Patent No.: US 12,721,468 B2
(45) Date of Patent: Sep. 1, 2026

(54) VALVE DEVICE

(71) Applicant: DE' LONGHI APPLIANCES S.R.L. CON UNICO SOCIO, Treviso (IT)

(72) Inventors: Paolo Evangelisti, Treviso (IT); Nicola Piovan, Treviso (IT); Davide Bonotto, Treviso (IT)

(73) Assignee: DE' LONGHI APPLIANCES S.R.L. CON UNICO SOCIO, Treviso (IT)

(*) Notice: Subject to any disclaimer, the term of this patent is extended or adjusted under 35 U.S.C. 154(b) by 701 days.

(21) Appl. No.: 18/034,703

(22) PCT Filed: Oct. 26, 2021

(86) PCT No.: PCT/IT2021/050344
§ 371 (c)(1),
(2) Date: Apr. 29, 2023

(87) PCT Pub. No.: WO2022/091151
PCT Pub. Date: May 5, 2022

(65) Prior Publication Data

US 2023/0389746 A1 Dec. 7, 2023

(30) Foreign Application Priority Data

Oct. 29, 2020 (IT) ........................ 102020000025651

(51) Int. Cl.
*A47J 31/46* (2006.01)
*A47J 31/44* (2006.01)
(Continued)

(52) U.S. Cl.
CPC ......... *A47J 31/461* (2018.08); *A47J 31/4496* (2013.01); *F16K 1/36* (2013.01);
(Continued)

(58) Field of Classification Search
CPC ........ A47J 31/461; A47J 31/4496; F16K 1/34
See application file for complete search history.

(56) References Cited

U.S. PATENT DOCUMENTS 9,480,361 B2 * 11/2016 Ozanne ................ A47J 31/461
2003/0034073 A1 2/2003 Roth
(Continued)

FOREIGN PATENT DOCUMENTS

EP 2 299 155 A1 3/2011
EP 3 311 713 A1 4/2018
(Continued)

OTHER PUBLICATIONS

International Search Report and Written Opinion for PCT/IT2021/050344, mailed Feb. 16, 2022.

*Primary Examiner* — Matthew J Kasztejna
(74) *Attorney, Agent, or Firm* — MARSHALL, GERSTEIN & BORUN LLP

(57) ABSTRACT

A valve device includes an entry aperture and an exit aperture for a fluid, a chamber which puts the entry and exit apertures in selective communication, a housing compartment, a piston disposed in the compartment, which is mobile between a closing position in which it prevents the transit of the fluid and an opening position in which it allows the passage of the fluid, and elastic return means associated with the piston A machine for preparing beverages includes at least one said valve device.

14 Claims, 3 Drawing Sheets

(51) Int. Cl.
*F16K 1/36* (2006.01)
*F16K 1/54* (2006.01)
*F16K 17/04* (2006.01)
*F16K 31/363* (2006.01)

(52) U.S. Cl.
CPC .............. *F16K 1/54* (2013.01); *F16K 17/046* (2013.01); *F16K 31/363* (2013.01); *F16K 2200/303* (2021.08)

(56) References Cited

U.S. PATENT DOCUMENTS

| | | | | |
|---|---|---|---|---|
| 2016/0157669 | A1* | 6/2016 | Andreis ................ | A47J 31/461 222/129.1 |
| 2018/0360260 | A1* | 12/2018 | Rotta ...................... | F16K 31/12 |
| 2022/0304497 | A1* | 9/2022 | Piras ..................... | A47J 31/461 |

FOREIGN PATENT DOCUMENTS

| | | | |
|---|---|---|---|
| WO | WO-2014/053439 | A1 | 4/2014 |
| WO | WO-2015/015370 | A1 | 2/2015 |

* cited by examiner

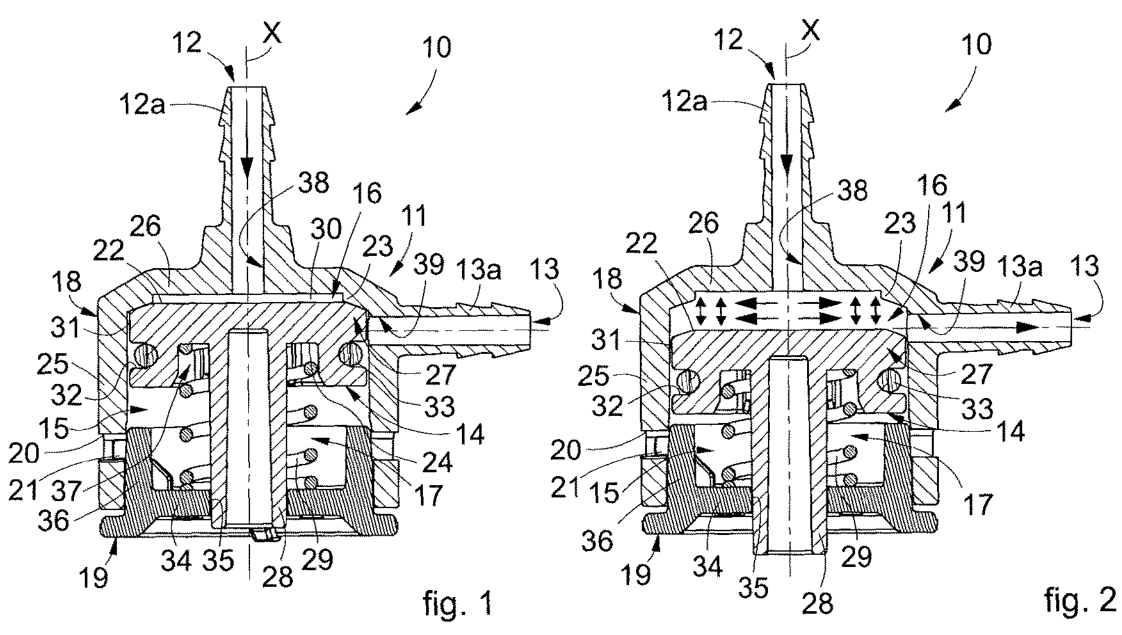
12
X
10
12a
38
16
26
30
11
22
23
39
13a
13
18
31
25
27
32
33
15
14
20
24
21
37
17
36
34
35
28
29
19
fig. 1
fig. 2
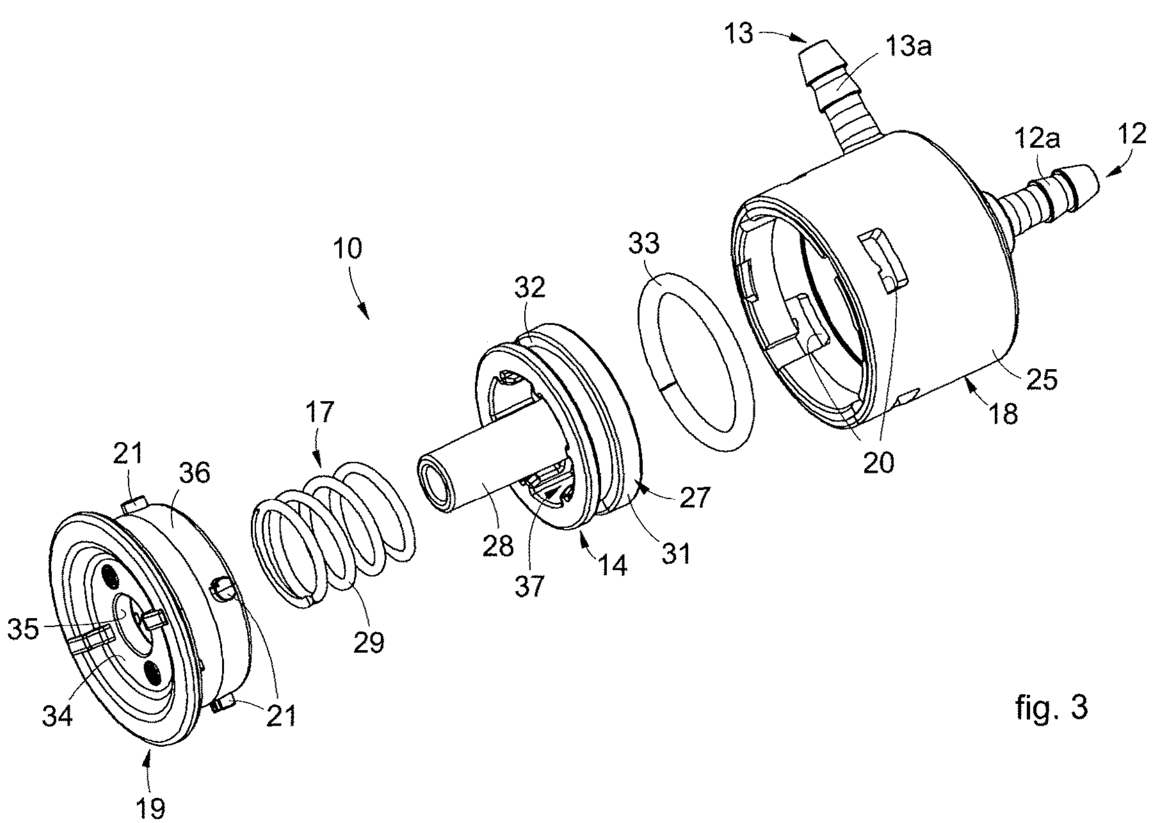
13
13a
12a
12
10
33
32
25
18
20
17
27
21
36
28
31
14
37
35
29
21
34
19
fig. 3

66
67
62
61b
59
58
10B
60
41
45
53
56
57
64
61a
54
55
52
42
10A
71
70
40
46
43
51
48
49
47
50
44

VALVE DEVICE

FIELD OF THE INVENTION

Embodiments described here concern a valve device, suitable to increase the pressure along a duct, which can also be used as a non-return valve. The device can be used, for example, in a machine for preparing coffee beverages, both as a delivery valve upstream of the brewing chamber and also as a cream whipper valve downstream of the brewing chamber. The device also has anti-limescale properties.

BACKGROUND OF THE INVENTION

Valve devices are known, used to increase the pressure inside a chamber, or a duct along which they are disposed.

For example, in machines for preparing coffee beverages, it is known to use a valve device downstream of the brewing chamber along the path of the fluid which functions as a cream whipper valve.

The increase in pressure along the beverage exit duct causes the generation of air bubbles that form a layer of froth on top of the beverage.

Known valve devices generally comprise a housing body, provided with at least one entry and one exit for the fluid, and a shutter body mobile inside the housing between an open position in which the fluid can flow through the valve device and a closed position in which it blocks the flow of fluid.

Furthermore, a spring is normally provided which acts on the shutter body, which is normally disposed along the path of the flow of fluid, in contact with it. These known valve devices have the disadvantage that, when used for flows of liquid, limescale can deposit on the coils of the springs, thus reducing their performance and requiring frequent descaling operations.

Furthermore, in the event that such valve devices have to be passed through by a coffee beverage, the solids dissolved in the beverage can also be deposited on the elastic elements. These solids are notoriously resistant, and tend to make things very dirty, which makes cleaning operations complex. In particular, coffee-making machines that require the use of such known valve devices frequently require that special cleaning and descaling cycles have to be carried out.

Known valve devices are for example described in WO-A-2014/053439A1, EP3311713A1, EP2299155A1 and WO2015/015370A1.

Document WO-A-2014/053439A1 describes a valve device to inject a fluid under pressure into a capsule containing coffee powder. This valve device comprises a shutter portion which is inserted inside a mating seating, in which an exit aperture for the liquid is provided, in which the shutter portion is kept positioned substantially in contact with the exit aperture by means of elastic means acting on the piston. This valve device is designed in such a way as to reduce to a minimum any internal spaces in which a liquid can accumulate, and requires high pressures to take it into an open condition.

Document EP describes a valve for a compressor, having a passage for the converging-diverging fluid, and a respective method to reduce pressure losses.

Other valve devices for espresso coffee machines are described in documents EP3311713A1 and WO2015/015370A.

Another disadvantage of known solutions is that known valve devices do not always guarantee that the direction of flow occurs in a single direction, and it may therefore happen that the flow fed in a certain direction tends to flow back.

One purpose of the present invention is to provide a valve device which can overcome the disadvantages of the solutions of the state of the art.

In particular, one purpose is to provide a valve device which prevents the accumulation of limescale and that can therefore be cleaned in a simple and effective way.

Another purpose of the present invention is to provide a simple and economical valve device.

Another purpose of the present invention is to provide a valve device which guarantees a stable and long-lasting compression force, even if subjected to continuous and repeated stresses.

Another purpose is to provide a valve device which can act as a non-return valve, guaranteeing that the fluid can flow in a single direction only.

Another purpose of the present invention is to perfect a machine for preparing coffee beverages which is highly efficient and which requires minimal cleaning and maintenance interventions.

Yet another purpose of the present invention is to provide a valve device which guarantees an optimal seal in the closed condition and which, however, can be used in applications that require relatively low pressure values.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes, the valve device comprises a valve body delimiting a housing compartment, an entry aperture and an exit aperture for a fluid, a chamber which puts the entry and exit apertures in selective communication, a piston, disposed in the compartment and mobile with respect to the exit aperture between a first closing position and a second opening position, and elastic return means associated with the piston.

According to one aspect of the present invention, the elastic means are located outside the chamber.

According to some embodiments, in the opening position, the entry and exit apertures are directly connected to each other.

In other words, apart from the mobile piston, there are no additional components disposed between the entry aperture and the exit aperture, or which help to even partly close the entry aperture.

According to another aspect of the invention, in the closing position of the valve device and in the position of maximum release of the elastic means, between a head surface of the piston and an entry wall of the valve body there remains defined a space substantially as wide as the housing compartment, wherein such space is directly facing the entry aperture.

This free space can therefore advantageously be filled by a liquid coming from the entry aperture, which can accumulate in the free space, thereby exerting pressure both on the head surface of the piston and also on the entry wall surrounding the entry aperture. It follows that, in this valve device, there is a large drive surface on which the liquid can act, so that on the one hand it is possible to have elastic means with high resistant force which guarantee an excellent sealed closure, and on the other hand it is possible to open the valve without requiring particularly high pressures of the liquid.

According to some embodiments, the free space has a width on the plane orthogonal to the direction of entry of the fluid at least equal to 80% of the width of the housing compartment, or greater than it.

According to some embodiments, the entry wall can have at least one flat portion disposed substantially parallel to the head surface of the piston which delimits the free space, which therefore can have a substantially constant depth. Consequently, the pressure exerted by the fluid is substantially constant over the entire contact surface and allows a uniform movement of the piston in the compartment.

Furthermore, thanks to the fact that the elastic means are positioned inside the chamber, that is, outside the path of the fluid, possible accumulations of limescale in them are prevented.

In addition, the disposition of the elastic means outside the path followed by the fluid makes the latter easy to clean.

This conformation therefore allows to use simple cup or helical metal springs as elastic means, without needing to provide specific and expensive components because, since they are protected from limescale, their useful life is not reduced, and they guarantee effective and efficient operation over time.

This makes the valve device suitable to be used also as a cream whipper valve in a machine for preparing coffee beverages, in direct contact with the coffee beverage. The beverage, in fact, remains confined in the chamber, without touching the elastic means in any way whatsoever.

According to some embodiments, the entry and exit apertures are positioned on adjacent sides of the housing, located substantially orthogonal to each other, and the action of the fluid against the piston moves the latter away from the exit aperture.

In particular, the fluid enters the valve device in a direction concordant with a direction of compression of the elastic means, and accumulates in the free space until the pressure of the fluid is sufficient to compress the elastic means and move the mobile piston away from the exit aperture.

According to some embodiments, the entry aperture can have an area much smaller than the area of the entry wall, for example comprised between 1/10 and 1/12 of the section, so as to maximize the useful area on which the fluid can act.

The valve body can comprise two half-shells provided with respective coupling members configured to cooperate with each other in order to obtain a stable coupling, wherein a first half-shell defines, together with the mobile piston, the valve chamber, and a second half-shell cooperates with the elastic means to supply a desired counter-pressure force to the mobile piston.

According to some embodiments, the mobile piston can comprise a rod extending from the opposite side with respect to the head surface, which is configured to slide in a through hole in the valve body, disposed substantially coaxial to the entry aperture, which acts as a guide for the mobile piston, keeping it aligned along the sliding axis.

According to one variant, the entry aperture and the exit aperture are disposed coaxial to each other and with respect to the sliding axis of the piston on opposite sides of the valve body. In this way, the path for the flow is substantially rectilinear, at least for most of its extension inside the valve device.

In this solution, the mobile piston is at least partly hollow and comprises inside it a transit channel for the fluid, which extends between at least one entry made through in the shutter portion and the end of the rod that defines the exit aperture. According to this embodiment, the elastic means are positioned around at least one part of the rod of the piston.

According to this embodiment, the shutter portion comprises a larger portion, connected to the rod, having a section substantially the same as the section of the housing compartment, and a smaller portion, on which the at least one entry is provided, having a section smaller than the housing compartment and defining with an internal wall of the latter a channel for the passage of the fluid toward the at least one entry.

According to some embodiments, the internal surface of the entry wall can have a shoulder in correspondence with its peripheral portion, which acts as an abutment for the piston head in the closing position, and the height of the shoulder substantially defines the height of the free space.

The present invention also concerns a machine for preparing coffee beverages, which comprises a brewing chamber connected upstream to a feed circuit for feeding hot water to the brewing chamber, and downstream to a circuit for delivering a coffee beverage, wherein the machine comprises at least one valve device according to the invention located upstream or downstream of the brewing chamber.

According to other embodiments, the machine comprises a first valve device according to the invention, located upstream of the brewing chamber, configured to define a minimum limit for the pressure of the water being fed, and a second valve device according to the invention, located downstream of the brewing chamber and configured to act as a cream whipper valve and promote the generation of air bubbles in the beverage.

BRIEF DESCRIPTION OF THE DRAWINGS

These and other aspects, characteristics and advantages of the present invention will become apparent from the following description of some embodiments, given as a non-restrictive example with reference to the attached drawings wherein:

FIG. 1 is a section view of a valve device according to some embodiments described here in a closed condition;

FIG. 2 is a section view of the valve device of FIG. 1 in an open condition;

FIG. 3 is an exploded view of the components of the valve device of FIGS. 1 and 2;

Figures 4, 5, 6, 7:
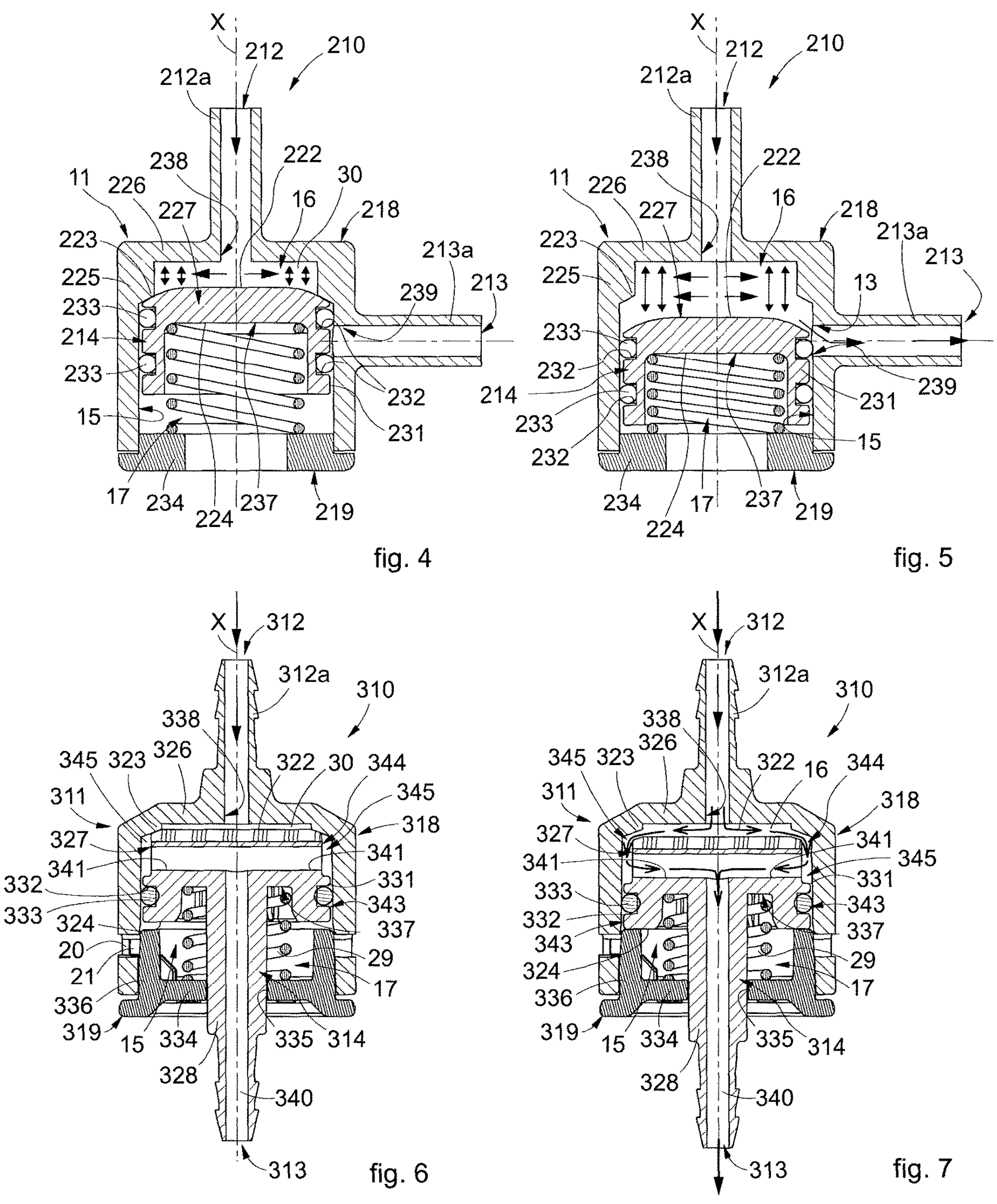
FIG. 4 is a section view of a valve device in accordance with a first variant in the closed condition.
FIG. 5 is a section view of the valve device of FIG. 4 in the open condition.
FIG. 6 is a section view of a valve device in accordance with a second variant in the closed condition.
FIG. 7 is a section view of the valve device of FIG. 6 in the open condition.

To facilitate comprehension, the same reference numbers have been used, where possible, to identify identical common elements in the drawings. It is understood that elements and characteristics of one embodiment can conveniently be combined or incorporated into other embodiments without further clarifications.

DESCRIPTION OF SOME EMBODIMENTS

We will now refer in detail to the possible embodiments of the invention, of which one or more examples are shown in the attached drawings, by way of a non-limiting illustration. The phraseology and terminology used here is also for the purposes of providing non-limiting examples.

In the following description, the terms "upper", "lower", "right", "left" are used with reference to the position of the elements shown in the respective drawings.

Some embodiments described here concern a valve device 10, which can be used to create a determinate pressure along a duct in which a fluid flows.

The device 10 can be used as a non-return valve to ensure that the fluid along the duct flows in a single direction only.

By way of a non-limiting example, the valve device 10 can be used in a machine 40 for preparing coffee beverages, for example as a cream whipper valve located downstream of a brewing chamber to generate the cream normally present in coffee beverages of the "Espresso" type, or as a delivery valve located upstream of the brewing chamber to ensure that a predefined pressure is reached.

The device 10 comprises a valve body 11 comprising an entry aperture 12 and an exit aperture 13 for a fluid, which can be connected to respective entry 12*a* and exit 13*a* ducts.

The device 10 also comprises a chamber 16 which puts the entry 12 and exit 13 apertures in selective communication when the device 10 is in an open condition.

The device 10 also comprises a housing compartment 15.

The housing compartment 15 can be defined and delimited by the valve body 11.

The valve device 10 also comprises a piston 14 mobile inside the compartment 15.

In particular, the piston 14 can cooperate with the valve body 11 to define with it the chamber 16 inside the compartment 15.

The chamber 16 is always put in direct communication with the entry aperture 12. In other words, there are no interception or obstruction means disposed to close the entry aperture 12.

The piston 14 is configured to move between a closing position in which it prevents the transit of the fluid through the exit aperture 13, and an opening position in which it allows the transit of the fluid through it.

In particular, the piston 14 is mobile along a central axis X, which defines a sliding axis.

The device 10 also comprises elastic return means 17, which are associated with the piston 14 and are configured to keep the piston 14 in the closing position until the pressure acting on it does not exceed a predefined limit value.

According to some embodiments, the valve body 11 comprises at least one entry wall 26 in which a through hole 38 is made which defines, or is connected to, the entry aperture 12.

According to some embodiments, in the closing position of the valve device 10 and in the position of maximum release of the elastic means 17, between a head surface 22 of the piston 14 and the entry wall 26 of the valve body 11 there remains defined a free space 30 substantially as wide as the housing compartment 15.

The free space 30 faces directly toward the entry aperture 12 and can therefore be filled with a fluid, in particular a liquid, coming from the entry aperture 12.

In this way, the chamber 16 has, on each occasion, a minimum volume Vmin in which a liquid coming from the entry aperture 12 can accumulate and be distributed in contact with the entire upper surface of the piston 14.

By way of example, the minimum volume Vmin of the chamber 16 can be greater than or equal to 10% of the maximum volume that the chamber 16 reaches when the valve device 10 is in a completely open condition. By way of example, the minimum volume Vmin, depending on applications, can be comprised between about 10% and about 60% of the maximum reachable volume, preferably between 15% and 40%.

According to some embodiments, the free space 30 has a width on a plane orthogonal to the central axis X of the piston 14 and to the direction of entry of the fluid equal to at least 80% of the width of the compartment 15, or even greater than it.

According to some embodiments, the entry wall 26 can have at least one flat portion disposed substantially parallel to the head surface 22 of the piston 14, which is also preferably flat, and the free space 30 is defined between them. In this way, the free space 30 can have a substantially constant depth along its extension and the fluid can act on both facing surfaces in order to move the piston 14 away from the exit aperture 13.

According to some embodiments, the entry aperture 12, or possibly the hole 38, can have an area much smaller than the area of the entry wall 26, for example comprised between 1/10 and 1/12 of its section, so as to maximize the useful area on which the fluid can act.

The movement of the piston 14 under the action of the pressurized fluid determines, in addition to the opening of the exit aperture 13, also the expansion of the volume of the chamber 16.

In particular, the thrust of the pressurized fluid acting on the mobile piston 14 puts the entry aperture 12 and the exit aperture 13 in direct communication.

In other words, there are no further deviations or tortuous paths between the entry 12 and exit 13 apertures, allowing the fluid to flow uniformly through the valve device 10, so as to reduce the possible zones of limescale accumulation to a minimum.

According to some embodiments, the valve body 11 can be formed by two half-shells, that is, an upper half-shell 18, or housing, defining the compartment 15 in which the piston 14, or at least part of it, and the elastic means 17 are housed, and a lower half-shell 19, or closing element, configured to couple to the upper half-shell 18 and close the compartment 15 at the lower part.

The upper half-shell 18 cooperates with the piston 14 to delimit the chamber 16, and the lower half-shell 19 keeps in position, possibly with a predefined compression, the elastic means 17 disposed in the compartment 15, outside the chamber 16.

The upper half-shell 18 and the lower half-shell 19 coupled to each other between them delimit the travel of the mobile piston 14.

The half-shells 18 and 19 can be provided with respective coupling members 20, 21 configured to cooperate with each other to obtain a stable coupling.

The coupling members 20, 21 can comprise respective cavities 20 and protruding elements 21 respectively provided on the upper half-shell 18 and on the lower half-shell 19, or vice versa, suitable to produce a same-shape coupling, for example a snap-in coupling.

According to possible variants, the coupling members 20, 21 can comprise respective threaded portions suitable to be screwed to each other, or even bayonet coupling members.

FIGS. 1-3 show by way of example a first embodiment of a valve device 10 in which the apertures 12 and 13 are oriented in different directions with respect to each other. For example, the two apertures 12, 13 can be disposed at an angle of 90° with respect to each other, although it is not excluded that they may be angled differently.

According to some embodiments, the two apertures 12, 13 can both be made on the upper half-shell 18, respectively passing through respective walls 26, 25 thereof. In this case, the entry 12*a* and exit 13*a* conduits can be made integral with the upper half-shell 18.

The upper half-shell 18 can comprise the entry wall 26, on which the entry aperture 12 is made, and a lateral wall 25 with a tubular shape, preferably cylindrical, on which the exit aperture 13, or a hole 39 connected thereto, is made.

According to some embodiments, the entry wall 26 comprises a shoulder 23 on which the head surface 22 of the piston 14 can be positioned in abutment when the valve device 10 is in the closed condition.

The shoulder 23 is preferably made on a peripheral portion of the entry wall 26, in correspondence with the lateral wall 25, and it extends inside the housing compartment 15.

The shoulder 23 delimits the free space 30 laterally and substantially defines its depth.

In the closing position, the head surface 22 of the piston 14 is positioned in contact with the shoulder 23, ensuring the formation of the free space 30.

According to some embodiments, the entry aperture 12 can be made in a central portion of the entry wall 26.

The mobile piston 14 can comprise a shutter portion 27 configured to close the exit aperture 13, which is provided at one end of the head surface 22.

According to the embodiment described with reference to FIGS. 1-3, the mobile piston 14 can also be provided with a rod 28 which extends from one end of the shutter portion 27, on the opposite side with respect to the head surface 22.

The shutter portion 27 can have a shape substantially corresponding to the internal section of the housing compartment 15, in this specific case cylindrical, having sizes correlated to those of the internal walls of the housing compartment 15, in such a way as to slide with respect to them, producing a seal.

According to some embodiments, in the lateral wall 31 of the shutter portion 27 there can be provided a groove 32 that develops along the circumference, suitable to house an annular gasket 33 in order to ensure a hydraulic seal of the chamber 16 between the piston 14 and the valve body 11, that is, the upper half-shell 18, preventing possible leakages of fluid.

According to some embodiments, it can also be provided that the piston 14, or at least the shutter portion 27, is made of deformable plastic material and that it is itself suitable to define a sealed coupling to the valve body 11.

The lower half-shell 19 can have a bottom wall 34 provided with at least one hole 35 for the passage of the rod 28. The hole 35 can advantageously act as a guide for the rod 28, helping to keep the piston 14 in the correct position inside the compartment 15, axially aligned with the central axis X of the valve body 11.

In this way, the lateral wall 31 of the shutter portion 27, or at least the gasket 33, is always positioned in contact with the internal surface of the compartment 15, substantially for its entire extension, thus guaranteeing a sealed closure of the chamber 16 and/or of the exit aperture 13 in every condition of use.

The elastic means 17 according to this embodiment can for example comprise a spring 29 of the helical type disposed between the bottom wall 34 of the lower half-shell 19 and a lower surface 24 of the shutter portion 27.

According to some embodiments, in the lower surface 24 of the mobile piston 14 a cavity 37 can be provided in which one end of the elastic means 17 can be housed.

The lower half-shell 19 can comprise a lateral wall 36, in this specific case substantially cylindrical, suitable to be inserted, during use, at least partly inside the upper half-shell 18.

The lateral wall 36 can act as an end-of-travel element for the piston 14 in the opening position.

FIGS. 1 and 2 show respectively the valve device 10 in the closed condition and in the open condition.

As can be seen in FIG. 1, in the closed condition, the shutter portion 27 is overlapping on the exit aperture 13 and prevents the transit of the fluid through it.

The fluid enters through the entry aperture 12 and accumulates in the free space 30 until it reaches a determinate pressure, following the path indicated by the arrows in FIG. 1.

As the pressure of the fluid gradually increases, it will tend to exert a force on both walls 22, 26, until the force exerted is sufficient to overcome the elastic force of the elastic means 17, and consequently cause the shutter portion 27 to move away from the exit aperture 13, so as to take the valve device 10 into the open condition (FIG. 2) and allow the fluid to pass through the valve device 10 following the path indicated by the arrows in FIG. 2.

In this way, the fluid can transit directly from the entry aperture 12 to the exit aperture 13.

When the pressure of the fluid is no longer sufficient to keep the elastic means 17 in compression, these will return the shutter portion 27 to a position overlapping on the exit aperture 13, closing the latter.

Thanks to its conformation, the valve device 10 is also suitable to function as a non-return valve. In fact, when the fluid enters from the entry aperture 12 and accumulates in the chamber 16, the pressure force that it exerts is distributed over a large area, that is, over the entire head surface 22 and on the entry wall 26, while if the fluid enters from the exit aperture 13, the force exerted by it acts in a lateral direction on the shutter portion 27 which, however, in that direction has no margin for movement, therefore a closure of the valve device 10 is in fact guaranteed for any pressure whatsoever of a possible fluid coming from the exit aperture 13.

The piston 14 can comprise a cavity 37 at the lower part suitable to at least partly house the elastic means 17 and keep them in position.

FIGS. 4 and 5 show a second embodiment of a valve device 210. The same elements are indicated with the same reference numbers and are not described further.

As also provided in the embodiment shown in FIGS. 1-3, the entry 212 and exit 213 apertures are not coaxial to each other but they are oriented in different directions. Although in FIGS. 4 and 5 they are shown disposed substantially orthogonal to each other, it is not excluded that the apertures 212, 213 can be positioned at different angles, in order to adapt to the connection ducts of the specific application, for example inclined by 45°, or having an L shape or a curved shape, or suchlike.

The valve body 11 can also in this case comprise an upper half-shell 218 and a lower half-shell 219.

The upper half-shell 218 can comprise a tubular lateral wall 225 and a substantially flat entry wall 226, in which respective through holes 239, 238 are made.

The through holes 238, 239 directly define, or are connected by means of respective ducts 212*a* and 213*a* to, the entry 212 and exit 213 apertures.

The upper half-shell 218 substantially defines the housing compartment 15 for the mobile piston 214 and the elastic means 17, and is closed at the lower part by the lower half-shell 219.

Also in this case, the elastic means 17 are disposed in the housing compartment 15 outside the chamber 16, and the thrust of the fluid entering through the entry aperture 212 on the mobile piston 214 puts the entry aperture 212 and the exit aperture 213 in direct communication.

According to this embodiment, the mobile piston 214 has a radial size corresponding to the internal section of the housing compartment 15, and is suitable to cooperate with it to ensure a sealed closure of the chamber 16.

The mobile piston 214 comprises a head surface 222 which delimits the chamber 16 at the lower part, and a lateral wall 231 which, in this case, acts as a shutter portion and cooperates directly with the through hole 239, defining or being connected to the exit aperture 213, made in the lateral wall 225.

Also according to this embodiment, in the closed condition of the valve device 210 and in the position of maximum release of the elastic means 17, between the head surface 222 and the entry wall 226 there remains a free space 30 directly facing the entry aperture. This free space 30 substantially has a shape and sizes similar to those of the free space 30 of the embodiment of FIGS. 1-3.

In the example case, the lateral wall 231 can comprise two grooves 232, each suitable to house a respective annular gasket 233, which are disposed, in the closed condition of the valve device 10, on the opposite sides of the through hole 239, so as to act as a non-return valve, preventing any unwanted leakage of fluid coming from the exit aperture 213.

According to other variants, not shown, the lateral wall 231 can itself act as a head gasket and can be at least partly made of deformable material, so as to cooperate directly with the lateral wall 225. This solution has the advantage of guaranteeing the seal for longer periods of time since, unlike the annular gasket which can be damaged over time due to the interference with the edge of the exit aperture 213, the head gasket does not present such problems.

The conformation of the valve device 210 prevents the fluid from entering into the valve body 11 from the exit aperture 213, whatever the pressure of the fluid, and is therefore extremely effective as a non-return valve. The pressure of the fluid entering from the exit aperture 213 will also tend to increase the seal of the annular gasket/s 233 or of the head gasket, or of the lateral wall 231.

According to some embodiments, the housing compartment 15 and/or the entry wall 226 comprises a shoulder 223 configured to act as a striker and abutment element for the piston 214, so as to ensure that the chamber 16, even in the closed condition of the valve device 210, always has a minimum volume Vmin suitable to allow the accumulation of a determinate quantity of fluid, which defines the free space 30.

The minimum volume Vmin can be substantially equal to that provided for the valve device 10, or even smaller than it, since also in this case there is a large surface 222, 226 on which the fluid at entry can act.

The piston 214 can comprise at the lower part a cavity 237 suitable to at least partly house the elastic means 17 and keep them in position.

FIGS. 4 and 5 respectively show the valve device 210 in the closed condition and in the open condition.

As can be seen in FIG. 4, in the closed condition, the lateral wall 231 is placed so as to close the through hole 239 and therefore the exit aperture 213, and prevents the transit of the fluid through it.

The fluid enters through the entry aperture 212 directly into the chamber 16, and in particular into the free space 30 between the head surface 222 and the entry wall 226, following the path indicated by the arrows in FIG. 5.

As the pressure of the fluid gradually increases, it will tend to exert a force on both surfaces 222, 226 until the force exerted is sufficient to overcome the elastic force of the elastic means 17, thrusting the mobile piston 214 in such a way as to move it at least partly away from the through hole 239, and take the valve device 210 into the open condition (FIG. 5), putting the chamber 16 in communication with the exit aperture 213.

When the pressure of the fluid decreases and is no longer able to contrast the force supplied by the elastic means 17, these extend taking the mobile piston 214 back to the closing position.

FIGS. 6 and 7 show a third embodiment of a valve device 310 according to the invention. The elements identical to the other embodiments are indicated with the same reference numbers and are not described further.

According to this embodiment, the entry aperture 312 and the exit aperture 313 are disposed coaxial to each other and with respect to the sliding axis X of the mobile piston 314, on opposite sides of the valve body 311. In this way, the path for the flow is substantially rectilinear, at least for most of its extension inside the valve device 310.

The upper half-shell 318 can comprise a through hole 338 made on an entry wall 326, preferably on a substantially flat portion thereof, which directly defines, or is connected by means of a duct 312*a* to, the entry aperture 312.

In this solution, the mobile piston 314 comprises the shutter portion 327, the end surface of which defines the head surface 322, and a rod 328 which extends from the side opposite the head surface 322.

The mobile piston 314 is at least partly hollow and comprises inside it a transit channel 340 for the fluid, which extends between at least one entry 341 made through in the shutter portion 327 and an exit made at the end of the rod 328, which defines the exit aperture 313.

According to this embodiment, the elastic means 17 are positioned around at least one part of the rod 328, with one end disposed in a cavity 327 made in a lower surface 324 of the shutter portion 327 and the opposite end in contact with a bottom wall 334 of the valve body 11.

According to this embodiment, the shutter portion 327 comprises a larger portion 343, connected to the rod 328, having a section substantially the same as the section of the housing compartment 15, and a smaller portion 344 on which the at least one entry 341 is provided, having a smaller section than the housing compartment 15 and defining with an internal wall of the latter a channel 345 for the passage of the fluid from the free space 30 to the at least one entry 341.

According to the embodiment of FIGS. 6 and 7, the internal surface of the entry wall 326 can have a shoulder 323 in correspondence with its peripheral portion, which acts as an abutment for the head surface 322 of the piston 314 in the closing position, so as to close the passage channel 345 for the fluid and define the free space 30.

According to this embodiment, it can be provided that the smaller portion 344, or at least the part thereof defining the head surface 322, is made of rubber in order to ensure the seal of the valve device 310 in the closed condition, when the elastic means 17 thrust the surface head 322 against the shoulder 323.

FIGS. 6 and 7 respectively show the valve device 310 in the closed condition and in the open condition.

As can be seen in FIG. 6, in the closed condition, the head surface 322 is positioned in abutment against the shoulder 323 and closes the passage channel 345, preventing the fluid from reaching the entry 341 made on the mobile piston 314.

The fluid enters the chamber 16 through the entry aperture 312 in a direction concordant with the direction of compression of the elastic means 17, along the central axis X, it accumulates in the free space 30 until it reaches a determinate pressure sufficient to compress the elastic means 17 and to move the head of the piston 14 away from the entry wall 326 so as to open the channel 345 for the passage of the fluid toward the entry 341 of the transit channel 340, through which it reaches the exit aperture 313.

The valve device 10, 210, 310 substantially consists of four components, making it extremely simple to manufacture and assemble. In fact, it is sufficient to insert a mobile piston 14, 214, 314 in the compartment 15 in such a way as to define a chamber 16 between the upper half-shell 18, 218, 318 and a head surface 22, 222, 322 of the mobile piston 14, 214, 314, position the elastic means 17 in contact with a lower surface 24, 224, 324 or in a cavity 37, 237, 337 of the mobile piston 14, 214, 314, in the opposite direction to the chamber 16, and close the compartment 15 at the lower part at least partly to contrast the elastic means 17.

According to some embodiments, the method provides to position the elastic means 17 in the shape of a helical spring 29 outside and coaxially to a rod 28, 328 of the piston 14, 314 (FIGS. 1-2 and 6-7).

Figure 8:
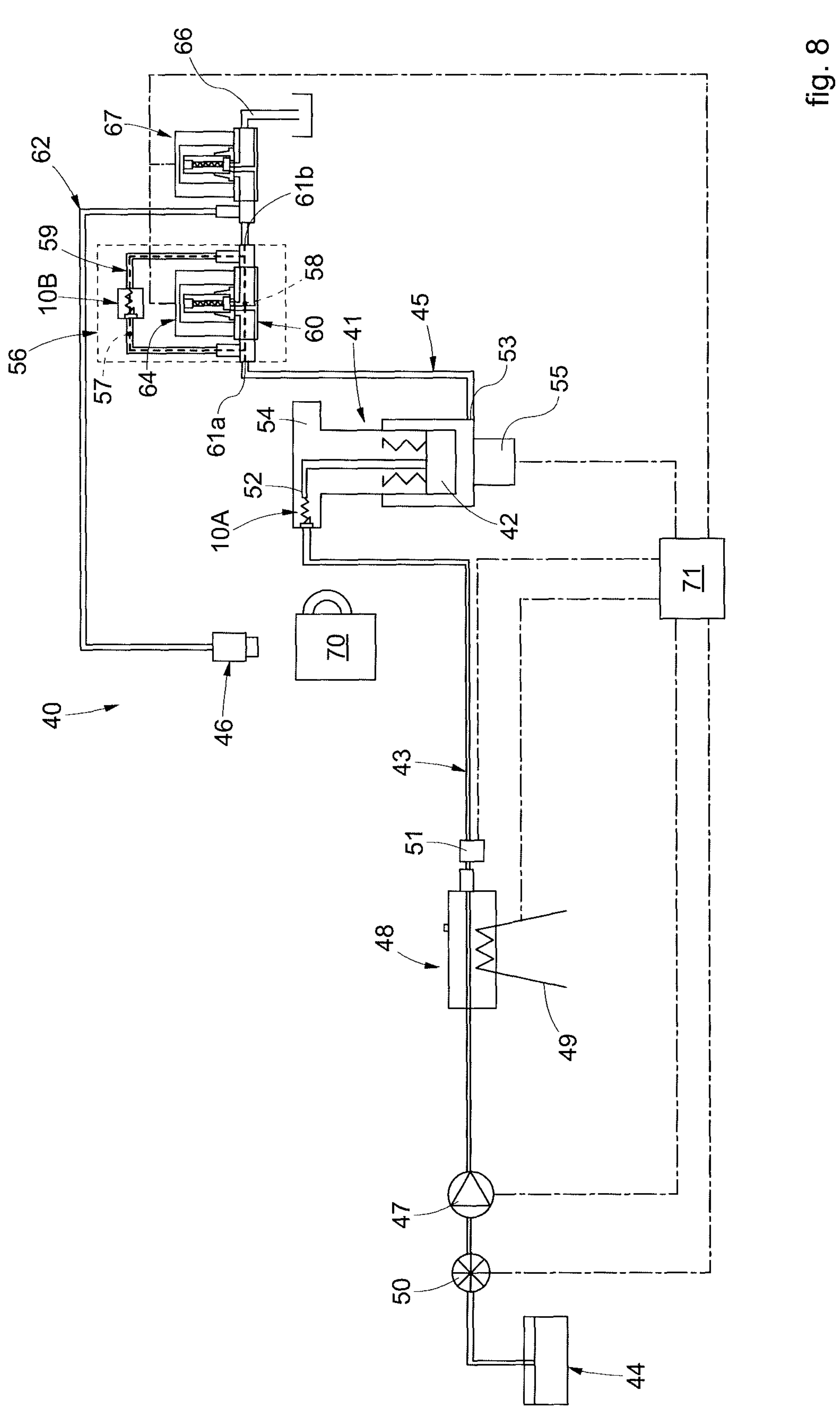
FIG. 8 is a schematic view of a machine for preparing coffee beverages in accordance with the embodiments described here.

Some embodiments described here with reference to FIG. 8 concern a machine 40 of the automatic type for preparing coffee beverages.

The machine 40 comprises a brewing unit 41 provided with a brewing chamber 42.

The machine 40 comprises a water feed circuit 43 configured to feed water from a source 44 to the brewing chamber 42, and a beverage exit circuit 45 by means of which the beverage exits from the brewing chamber 42 and can be fed to a delivery nozzle 46.

The water source can be a tank 44, or a connection to a water mains network.

Along the water feed circuit 43 there can be provided a feed pump 47 and a heating device 48, for example a boiler provided with heating means 49, for example comprising one or more electric resistances, suitable to heat the water flow before it reaches the brewing chamber 42.

Detection devices can also be provided along the water feed circuit 43, suitable to detect one or more parameters of the water flow in transit, for example a flow meter 50, preferably located upstream of the feed pump 47, and/or temperature sensors 51 located downstream and/or upstream of the heating device 48.

According to some embodiments, the brewing chamber 42 comprises an entry aperture 52 in communication with the water feed circuit 43, and an exit aperture 53 in communication with the beverage exit circuit 45.

The entry 52 and exit 53 apertures can be made on opposite sides of the brewing chamber 42; even more preferably, one on a fixed body 54 and the other on a mobile piston 55.

The present invention concerns both machines 40 which provide to feed the water from above and to extract the beverage from below, and also machines which function with water feed and extraction in the opposite way.

According to some embodiments, the machine 40 comprises a valve device 10A according to any embodiment 10, 210, 310 of the present invention located upstream of the brewing chamber 42 along the path of the fluid, having the function of delivery valve.

In particular, the function of the valve device 10A is to keep the feed circuit 43 closed as long as the water being fed does not exceed a determinate pressure value, and to allow the water to be delivered into the brewing chamber 42 when this value is exceeded.

This ensures that the extraction of the aromatic substances from the coffee powder occurs only when the water has reached the desired pressure.

The valve device 10A also acts as a non-return valve, preventing the water being fed into the brewing chamber 42 from returning backward along the feed circuit 43.

According to some embodiments, the machine 40 comprises a valve device 10B according to any embodiment 10, 210, 310 of the present invention located downstream of the brewing chamber 42 along the path of the fluid, having the function of a cream whipper valve.

In particular, the function of the valve device 10B is to keep the beverage delivery circuit closed as long as the beverage does not exceed a determinate pressure value, and to allow the beverage to transit toward the delivery nozzle 46 when this value is exceeded.

The machine 40 can be configured to prepare both low-pressure coffee beverages, such as an American type coffee, also defined as “Drip”, or “Coffee”, and also high-pressure coffee beverages, such as an “Espresso” type coffee.

According to these embodiments, the machine 40 can comprise a valve unit 56 connected to the exit circuit 45 downstream of the brewing chamber 42 and configured to define a first high-pressure exit path 57 for an “Espresso” type coffee and a second low-pressure exit path 58 for a “Drip” type coffee.

The valve unit 56 comprises an entry 61*a* and an exit 61*b*, respectively connected to the exit circuit 45 and to a beverage delivery duct 62.

The delivery duct 62 is in turn connected to a delivery nozzle 46 by means of which the beverage can be delivered into a suitable receptacle 70.

Along a first branch 59 the valve unit 56 comprises the valve device 10B suitable to supply a desired counter-pressure force, and along a second branch 60 it comprises bypass means 64 selectively drivable in order to bypass the action of the valve device 10B, for example in the form of a solenoid valve.

The machine 40 can also comprise a control and command unit 71 configured to receive an indication regarding the beverage to be prepared, that is, a coffee beverage of the “Coffee” type to be prepared at low pressure, or a coffee beverage of the “Espresso” type to be prepared at high pressure, and drive the bypass means 64 accordingly.

The indication regarding the beverage to be prepared can be received as a result of a selection made by a user by means of a command interface, not shown.

In the event that a beverage to be prepared at high pressure is selected, the control and command unit 71 will command the bypass means 64 to close the second branch 60, forcing the coffee beverage to necessarily transit through the first branch 59.

On the other hand, in the event that a beverage to be prepared at low pressure is selected, the control and command unit 71 will command the bypass means 64 to open the second branch 60 in order to allow the beverage to transit toward the delivery nozzle 46, while the first branch 59 is closed by the valve device 10B.

According to some embodiments, the machine 10 can also comprise a discharge circuit 66 for the residual water deriving from the exhausted coffee powder, which for example is made as a derivation from the common delivery duct 62 and is normally kept closed by means of a discharge solenoid valve 67 disposed along it.

It is clear that modifications and/or additions of parts may be made to the valve device 10, 210, 310 and to the machine 40 for preparing coffee beverages as described heretofore, without departing from the field and scope of the present invention as defined by the claims.

In the following claims, the sole purpose of the references in brackets is to facilitate reading: they must not be considered as restrictive factors with regard to the field of protection claimed in the specific claims.

The invention claimed is:

1. A valve device comprising:

a valve body delimiting a housing compartment;

an entry aperture and an exit aperture for a fluid;

a chamber arranged to allow a transit of a fluid between the entry and exit apertures;

a piston disposed in said compartment, the piston being mobile between a closing position in which the piston prevents the transit of the fluid between the entry and exit apertures and an opening position in which the piston allows the transit of the fluid through said exit aperture;

a spring operatively associated with said piston and disposed outside said chamber, wherein in the closing position of said valve device and in a position of maximum release of said spring, a free space is defined between a head surface of said piston and an entry wall of said valve body, the free space directly facing said entry aperture; and further wherein a portion of a periphery of the entry wall has a reduced diameter thereby defining a shoulder, the shoulder sized and positioned to abut the head surface of the piston when the piston is in the closing position, and further wherein the shoulder delimits an extent of the reduced diameter of the portion of the periphery of the entry wall, thereby defining an outer extent of the free space.

2. The valve device as in claim 1, wherein when the piston is in the opening position the chamber defines a maximum volume, and when the piston is in the closing position a volume of the free space has a minimum volume comprising between about 10% and 60% of the maximum volume position.

3. The valve device as in claim 1, wherein said free space has a width on a plane orthogonal to an axis coaxial to said entry aperture of at least 80% of a width of said housing compartment.

4. The valve device as in claim 1, wherein said entry wall comprises at least one flat portion substantially parallel to said head surface and said free space has a substantially constant depth on a plane orthogonal to an axis (X) coaxial to said entry aperture when the piston is in the closing position.

5. The valve device as in claim 1, wherein said entry and exit apertures are disposed substantially orthogonal to each other and said piston comprises a shutter portion which delimits said chamber, separating it from the spring, and is provided with a lateral wall which acts on said exit aperture.

6. The valve device as in claim 1, wherein said entry aperture and said exit aperture are disposed coaxial to each other with respect to a central axis of said valve body, and said piston comprises a shutter portion provided at one end with said head surface and a rod which extends to the other end, wherein said piston is at least partly hollow and comprises an inside it a transit channel for the fluid, which extends between at least one entry made through said shutter portion and an end of said rod which defines said exit aperture.

7. The valve device as in claim 6, wherein said shutter portion comprises an enlarged portion connected to said rod and having a section arranged to slide within the housing compartment, the shutter portion further including a reduced portion on which said at least one entry is provided, the reduced portion having a section smaller than said larger portion and defining with an internal wall of said housing compartment a channel for the passage of said fluid toward said at least one entry.

8. The valve device as in at claim 6, wherein in a lateral wall of said shutter portion there is provided at least one circumferential groove suitable to house an annular gasket in order to create a hydraulic seal of said chamber between said piston and said valve body.

9. The valve device as in claim 1, wherein said piston has, on the opposite side of said chamber, a cavity configured to house at least part of said spring and to keep the spring in position.

10. The valve device as in claim 1, wherein said valve body comprises an upper half-shell defining an upper portion of said compartment, and a lower half-shell configured to couple to the upper half-shell and close said compartment at a lower part.

11. The valve device as in claim 1, wherein the entry aperture has an area of 1/10 to 1/12 of an area of the entry wall.

12. The valve device as in claim 1, wherein a height of said shoulder defines a height of the free space.

13. A machine for preparing coffee beverages, comprising:

at least one valve device as in claim 1;

and further including a brewing unit provided with a brewing chamber, connected by the entry aperture to a feed circuit for water, and by the exit aperture to an exit circuit for the beverage, the at least one valve device being located upstream or downstream of said brewing chamber.

14. The machine as in claim 13, wherein said at least one valve device is located upstream of said brewing chamber, configured to define a minimum limit for the pressure of the water being fed, and wherein said machine comprises a second valve device located downstream of said brewing chamber and configured to act as a cream whipper valve, and promote the generation of air bubbles in the beverage.

* * * * *